United States Patent [19]

Cheesman

[11] Patent Number: 4,553,671
[45] Date of Patent: Nov. 19, 1985

[54] TEAR-OPEN COMPARTMENTED CAT LITTER CONTAINER

[76] Inventor: Anthony Cheesman, 3959 32nd St., San Diego, Calif. 92104

[21] Appl. No.: 529,155

[22] Filed: Sep. 2, 1983

[51] Int. Cl.⁴ .................................................. B65D 5/54
[52] U.S. Cl. ....................................... 206/611; 119/1; 229/23 R; 229/34 A
[58] Field of Search ............... 119/1; 229/34 A, 7 SC, 229/17 SC, 23 R; 206/611, 612, 634; 220/345, 350, 429, 62, 68; 426/113, 122, 123

[56] References Cited

U.S. PATENT DOCUMENTS

| 2,292,540 | 8/1942 | Norton | 229/34 A |
| 2,741,223 | 4/1956 | Winborn, Jr. | 119/1 |
| 2,797,012 | 6/1957 | Buck, Jr. | 229/23 R X |
| 3,131,848 | 5/1964 | Floyd | 206/611 X |
| 4,030,448 | 6/1977 | Nuttall | 119/1 |
| 4,271,787 | 6/1981 | Wellman et al. | 119/1 |

FOREIGN PATENT DOCUMENTS 202503  8/1923  United Kingdom .................... 119/1

Primary Examiner—William T. Dixson, Jr.
Assistant Examiner—Gary E. Elkins
Attorney, Agent, or Firm—Charles C. Logan, II

[57] ABSTRACT

A disposable cat litter container having the animal litter material prepackaged in the container. The container has a rectangularly shaped top wall member having a central perforated tear-out portion. Extending upwardly from the lateral edges of the top member are a pair of inside side walls and a pair of inside end walls. The top edges of these respective inside walls have outside side walls and outside end walls attached to their top edges. The outside walls have a height greater than that of the inside walls and each of these have inwardly extending flanges along their bottom edges. A bottom cover member covers the chamber formed between the bottom surface of the top wall member and the inwardly extending flanges on the outside wall members. This chamber is filled with a predetermined amount of animal litter material. The container, with the exception of the bottom cover member, is formed from a single integral sheet of paperboard material.

3 Claims, 4 Drawing Figures

U.S. Patent   Nov. 19, 1985   4,553,671

TEAR-OPEN COMPARTMENTED CAT LITTER CONTAINER

BACKGROUND OF THE INVENTION

The present invention relates to a container for the waste material of trained house pets, and more particularly, to a disposable container for cats for use in their waste elimination.

Various types of particulated materials are sold for use as cat litter to provide a convienient place and means in the home for cats to perform their natural instinct of burying their feces and to provide an easy way to collect and dispose of the cat's waste. The litter material is normally sold in bags and is emptied into a box, pan or other container with low side walls and of sufficient size for the cat to stand in it and scratch the litter material without scattering the material outside the container. The litter containers used by the cat are often difficult to clean, in that the urine often filters down through the litter and settles in the bottom where the litter becomes permanently moist or saturated, making its removeable from the container a tedious and unpleasant task. In view of the effort involved in disposing of the waste and cleaning the cat litter container, disposable containers have been tried and used on a limited basis, but more of these have had certain inherent disadvantages, such as the unreliability of the container to retain the particulated material and urine, instability of the container, particularly the side walls, and the excess expense of providing a dependable disposable container each time the litter is discarded.

Is therefore one of the principal objects of the present invention to provide a folded cat litter box which is simple to open and easy to place in use.

It is also an object of the invention to provide a novel disposable cat litter box that is economical to produce and sturdy in construction.

It is another object of the invention to provide a packaged disposable cat litter container which requires no reuse washing and is convenient for disposing of the waste.

It is another object of the invention to provide a novel disposable cat litter container that has the cat litter material prepackaged in the container.

It is a further object of the invention to provide a novel disposable cat litter container which is simple and convenient to construct from a paperboard blank.

SUMMARY OF THE INVENTION

The present invention provides a disposable cat litter container formed of paperboard which is preferably waterproof coated or of a waterproof laminate material to be waterproofed. The disposable container has a rectangularly shaped top wall member having a central perforated tear-out portion. Extending upwardly from the lateral edges of the top wall member are the inside end walls and the inside side walls. A pair of outside side walls and a pair of outside end walls are connected to the respective top edges of the inside side walls and inside end walls. The bottom edges of the outside side walls and outside end walls have inwardly extending flanges. The height of the outside walls is greater than that of the inside walls thereby providing a chamber formed between the bottom surface of the top wall member and the bottom edges of the outside walls. The bottom of this chamber is closed by a bottom cover member and the chamber is filled with a predetermined amount of animal litter material which is moisture absorbant and also preferably contains a deodorant. The novel disposable cat litter container, with the exception of the bottom cover member, is formed from a single integral sheet of paperboard material. The novel disposable container would be purchased as a completely self contained unit and all that would be necessary in order to put into operation, would be to tear along the perforated line on the top surface of the top wall member to remove the central perforated tear-out portion. When the disposable container has been used for a sufficient amount of time, all that is necessary is to disposed of the complete unit rather than having to empty the litter material out and clean the container for reuse.

DESCRIPTION OF THE PREFERRED EMBODIMENT

Figure 1:
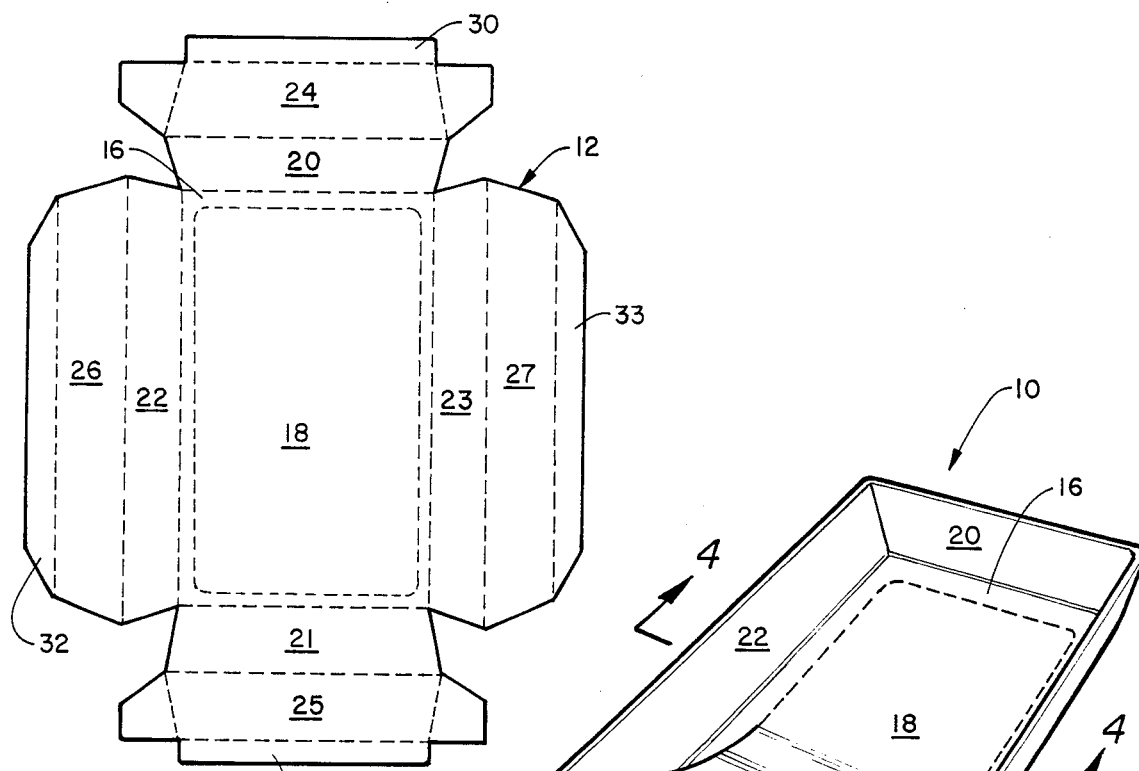
FIG. 1 is a top plan view of a blank from which the disposable cat litter container is formed.
Figure 2:
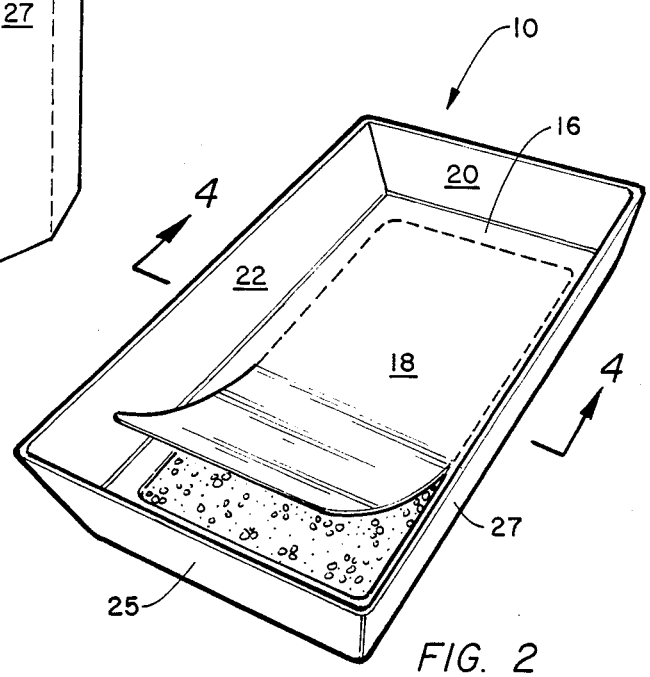
FIG. 2 is a perspective view of the embodiment shown in FIG. 1 folded into its functioning configuration.
Figure 3:
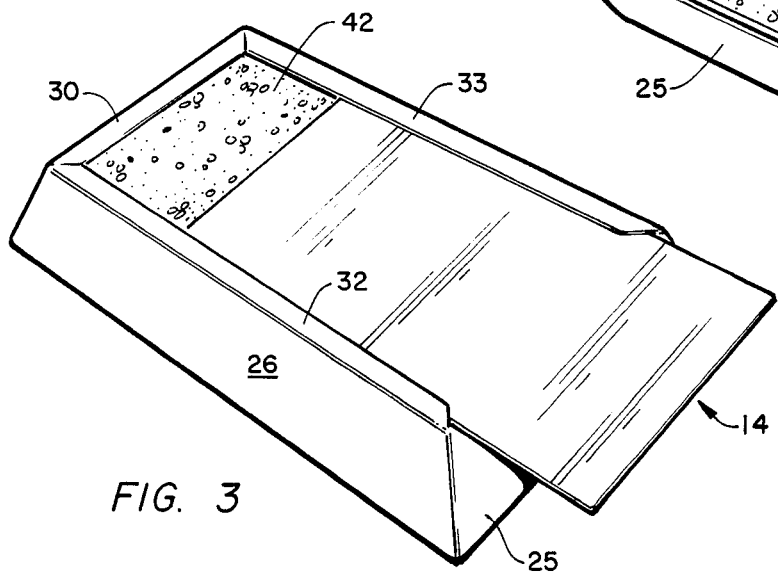
FIG. 3 is a bottom perspective view of the novel disposable cat litter container illustrating the bottom cover member partially installed.
Figure 4:
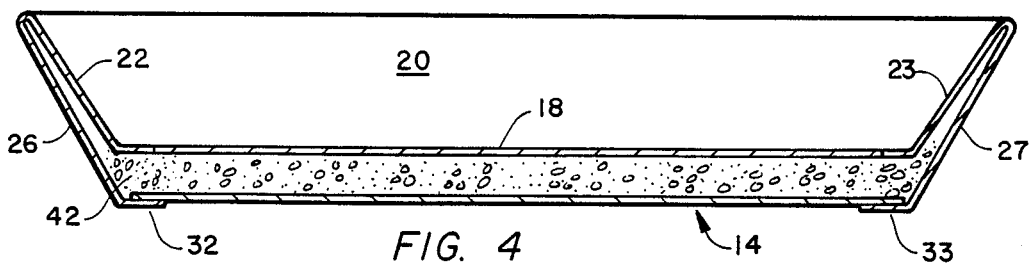
FIG. 4 is a cross-sectional view taken along lines 4—4 of FIG. 2.

Applicant's novel disposable cat litter container will be described by referring to FIGS. 1-4 of the drawings. The disposable container is generally designated numeral 10. Disposable container 10 is formed from two components, an elongated sheet of material 12 and the bottom cover member 14.

The sheet of material 12 has a rectangularly shaped top wall member 16 having a central perforated tear-out portion 18. A pair of inside end walls 20 and 21 and a pair of inside side walls 22 and 23 have their bottom edges connected to the respective side edges and end edges of top wall member 16. Inside end walls 20 and 21 and inside side walls 22 and 23 are bent upwardly from top wall member 16. Outside end walls 24 and 25 and outside side walls 26 and 27 have their top edges connected to the respective top edges of the inside end walls and inside side walls. The outside end walls and outside side walls are bent downwardly and they have a height greater than that of the inside end walls and inside side walls, respectively. Flanges 30 and 31 are attached to the bottom edges of outside end walls 24 and 25 and are bent inwardly. Flanges 32 and 33 are attached to the bottom edges of outside walls 26 and 27, respectively, and they are bent inwardly (see FIG. 4). Bottom cover member 14 covers the chamber 40 formed between the bottom surface of top wall member 16 and the inwardly extending flanges 30-33. Chamber 40 is filled with a predetermined amount of animal litter material 42.

It is to be understood that although the preferred embodiment is described as being made of paperboard, there are other materials that could be used such as plastic, styrofoam, etc.

What is claimed is:

1. A disposable container with litter for animals compising:
   a top wall member in the form of an elongated sheet of material having a front edge and rear edge and lateral side edges, said top wall member having a central perforated tear-out portion;

a pair of inside end walls and a pair of inside side walls having their bottom edges connected to the respective side edges and end edges of said top wall member;

a pair of outside end walls and a pair of outside side walls having their top edges connected to the respective top edges of said inside end walls and said inside side walls, said outside end walls and said outside side walls having a height greater than that of said inside end walls and said inside side walls, respectively;

means for attaching a bottom cover member to the bottom of said outside walls comprising inwardly extending flanges;

a bottom cover member;

a chamber formed between the bottom surface of said top wall member, said end walls, said side walls, and said bottom cover member; and said chamber being filled with a predetermined amount of animal litter material.

2. A disposable container as recited in claim 1 wherein said top wall member, said pair of inside end walls, said pair of inside side walls, said pair of outside end walls, said pair of outside side walls, and the inwardly extending flanges of said outside wall members are formed from a single integral sheet of material.

3. A disposable container as recited in claim 1 wherein the top edges of said end walls and the top edges of said side walls are longer than the bottom edges of said respective end walls and side walls.

* * * * *